Figure 1A:
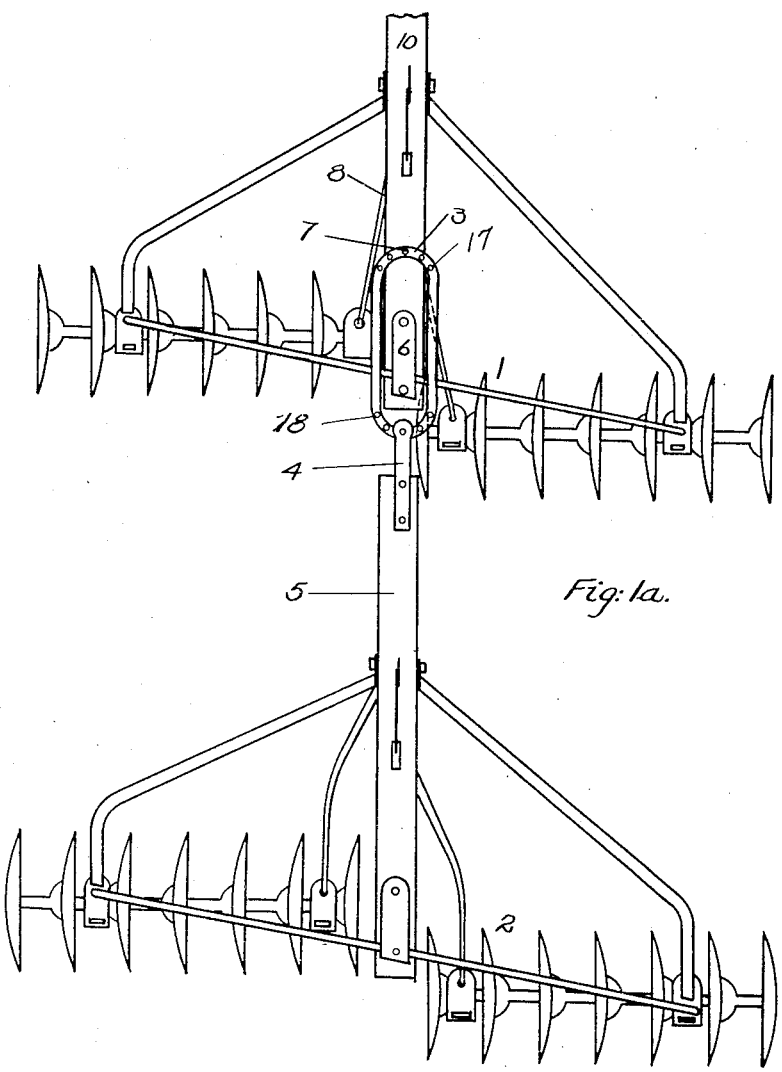

T. E. BISSELL.
DISK HARROW.
APPLICATION FILED JAN. 8, 1918.
1,331,229.
Patented Feb. 17, 1920.
3 SHEETS—SHEET 1.
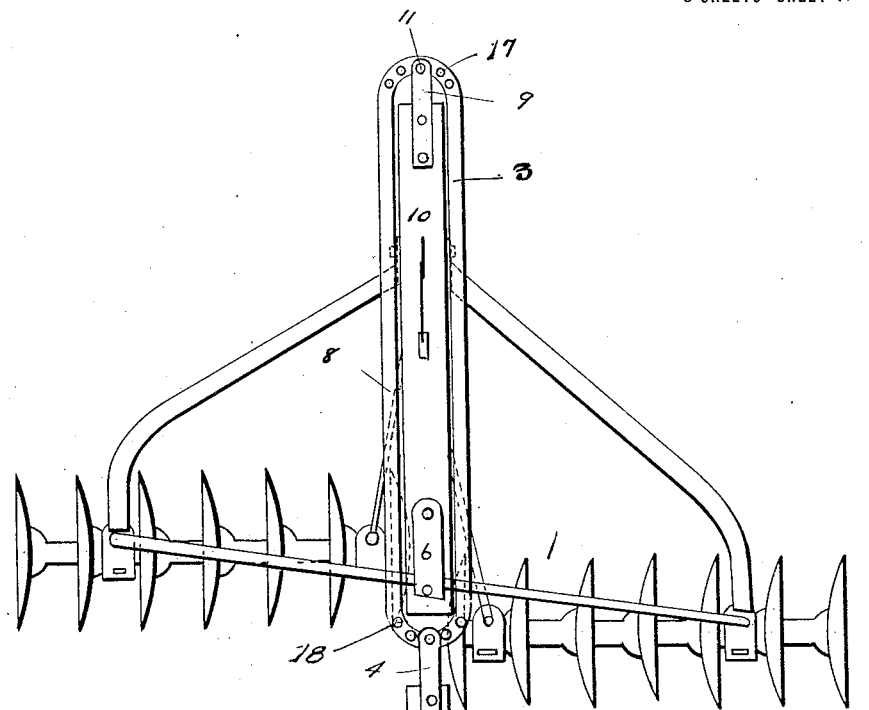
Fig. 1
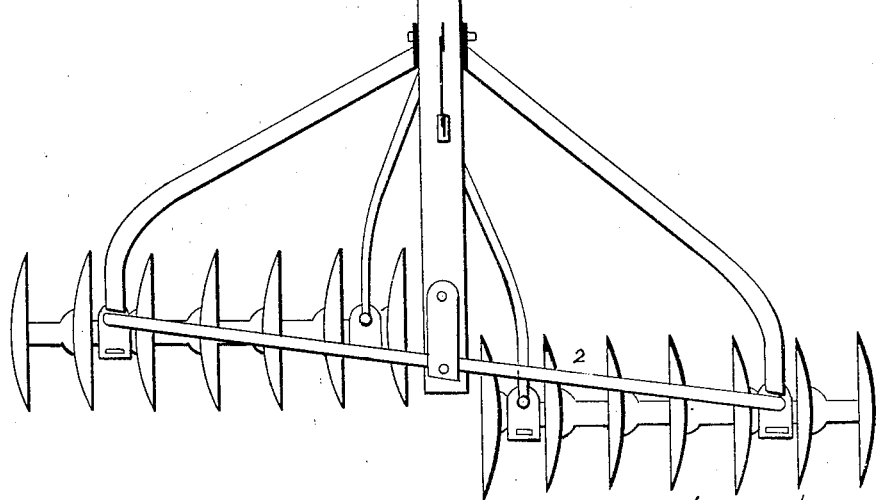

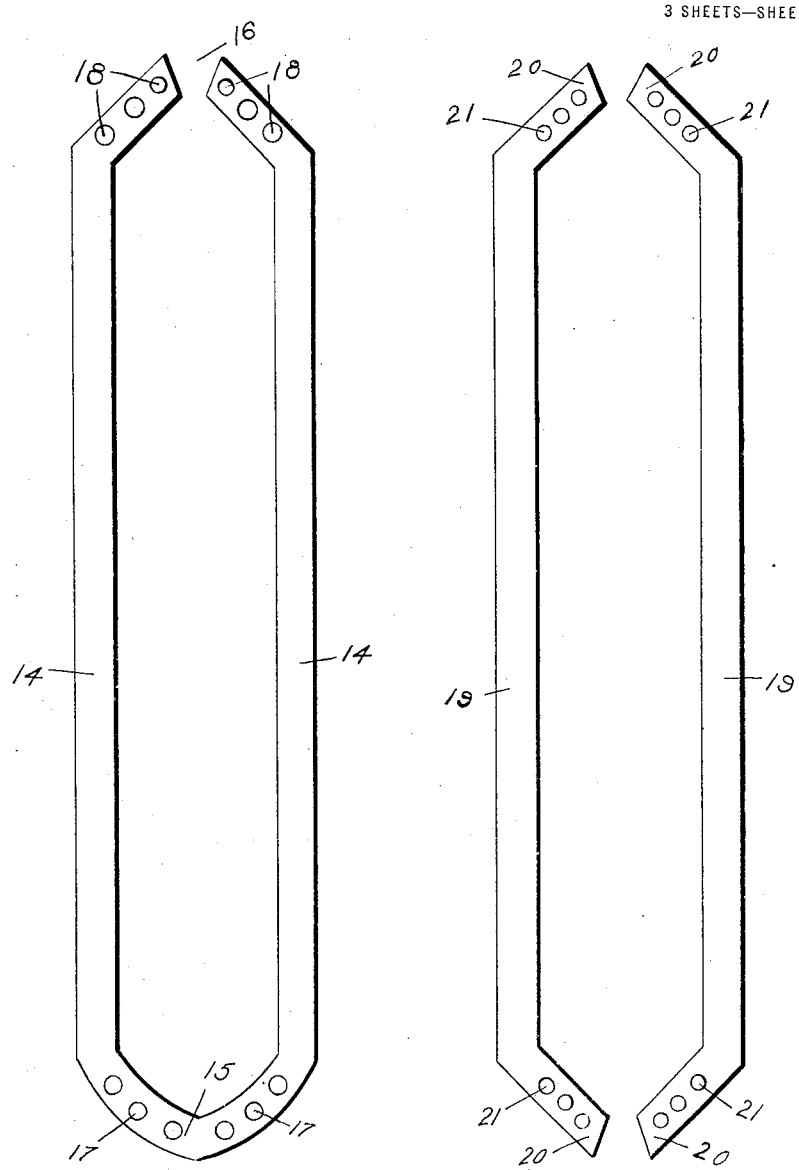

UNITED STATES PATENT OFFICE.

TORRANCE EDWARD BISSELL, OF ELORA, ONTARIO, CANADA, ASSIGNOR TO T. E. BISSELL COMPANY LIMITED, OF ELORA, ONTARIO, CANADA, A CORPORATION OF ONTARIO.

DISK HARROW.

1,331,229.   Specification of Letters Patent.   Patented Feb. 17, 1920.

Application filed January 8, 1918. Serial No. 210,952.

*To all whom it may concern:*

Be it known that I, TORRANCE EDWARD BISSELL, a subject of the King of Great Britain, residing at the village of Elora, in the county of Wellington and Province of Ontario, Dominion of Canada, have invented certain new and useful Improvements in Disk Harrows; and I hereby declare that the following is a full, clear, and exact description of the same.

My invention relates to improvements in tandem disk harrows, and more particularly to the draft connection between the disk harrow units.

Prior to my invention, this connection comprised a reach bar, having its rear end connected to the rear disk frame and extending forward to the front disk frame, and a horizontally-swinging pivotal connection between the reach bar and the front disk frame, and located in a longitudinal line with the apex of the converging angle of the forward disk-carrying shafts.

With this direct connection between the front and rear disk harrow frames, it is practically impossible, in passing over inequalities in the ground, to obtain effective results in the treatment of the ground, or to avoid injurious straining of the disk harrow frames.

The object of my invention is to arrange the connection between the units, in such a manner that all present difficulties will be overcome, and a maximum efficiency obtained in the treatment of the ground.

To that end, my invention consists, broadly, of a draft connection between units, of a tandem disk harrow, one end of such connection being attached to the rear unit, and the other end to the draft point of the front unit.

In the drawings:—

Figure 1, is a top plan view of the tandem disk harrow, showing the long loop connection.

Fig. 1ª is a similar view to Fig. 1, showing the short loop connection; and

Figs. 2 and 3, are enlarged detached views of modifications of the loop connections shown in Figs. 1 and 1ª.

Referring to the drawings, and particularly to Figs. 1 and 1ª, it will be seen that the disk harrows 1 and 2, of well-known construction, form the units which are joined by my improved connection, for co-operative action.

Such connection consists of an elongated rigid metal loop 3, shown in Fig. 1ª, the rear end of which is loosely engaged with the clevis 4, at the forward end of the pole 5, of the rear unit 2.

The loop 3 loosely encircles the socket 6 of the seat on the front unit, to permit vertical play of such loop. The forward end of the loop 3 is in loose engagement with the draw-pin 7, which connects the double-tree of the pole 10, which constitutes the draft-point, when horses are employed. The loop 3 is provided with sockets 17 and 18 which permit of either end of the loop being laterally adjustable with respect to the draw pin or pins.

In Fig. 1, I have shown the same looped formation of attachment 8, with a similar connection with the clevis 4 upon the rear unit 2. This loop 8 is longer than the loop 3, shown in Fig. 1ª, and extends forward to the clevis 9 on the pole 10 of unit 1. The draw-pin 11 loosely engages with the forward end of loop 8, and forms the draft-point, when a tractor is employed, the drawbar of the tractor being held in engagement by the draw-pin 11.

Fig. 3 shows one form of connection, with side bars 14, 14, closed end 15, and open end 16. The closed end 15 has the spaced sockets 17 and the open end the spaced sockets 18, which permit of either end of the draft connection being laterally adjustable at the point of attachment, this adjustment being effected by inserting the draw pin or pins through any selected spaced socket or sockets.

Fig. 2 shows another form of connection, with twin bars 19, 19, with inwardly-extending end arms 20, each arm being provided with the spaced sockets 21, for the same adjustment as the sockets 17 and 18. This lateral adjustment is for the purpose of shifting the point of connection from one side to the other, of the median line passing through the two units, thus enabling the rear disk harrow to cultivate the uncut strip of earth left in line with the center of the front disk harrow.

This feature of having the rear harrow project to either side of the front harrow, is a great advantage in cultivating orchards, vineyards, etc., as the rear harrow, being used in the "in-throw" form, can be projected horizontally to one side, and the earth turned from the rows. By this arrangement, the front harrow, which is in the "out-throw" form, can be used simultaneously to turn the earth toward the rows, thus giving the double result of a reversible harrow in the tandem form, without further adjustment by the operator.

It will be seen that, with my improved arrangement, the points of connection of the units are not directly between the adjacent ends of the frames, as heretofore, but are between the rear frame and the draft-point of the front frame.

By using the draft-points, as shown, any possible strain upon the disk harrow frames, or upon the neck yokes of the horses, is materially lessened.

With my improved construction and arrangement, when the horses or tractor and the rear disk harrow are on a higher plane than the front disk harrow, as in crossing a deep furrow, ordinarily the front harrow would be raised, in which position, the disks would not perform their proper functions.

By employing the draft-points for connection with the front harrow, such harrow is allowed to drop and follow the contour of the ground, thus preserving the efficiency of both gangs of disks on the front harrow.

Having thus fully described the nature of my invention, what I claim as new and desire to secure by Letters Patent, is:—

1. A draft connection between units of a tandem disk harrow, said connection being attached to the draft point of the front unit and pivotally attached to the rear unit.

2. A draft connection between units of a tandem disk harrow, one end of such connection being pivotally attached to the rear unit, and the other end pivotally attached to the draft-point of the front unit.

3. A draft connection between units of a tandem disk harrow, one end of such connection being pivotally attached to the rear unit, and the other end pivotally attached to the draft-point of the front unit, either end being laterally adjustable at the point of connection.

4. A draft connection between units of a tandem disk harrow, consisting of an elongated rigid metal loop encircling the socket of the seat of the front harrow, said loop being attached to the draft point of the front unit and pivotally attached to the rear unit.

5. A draft connection between units of a tandem disk harrow, consisting of an elongated loop loosely encircling the socket of the seat of the front unit for the vertical play of said loop, the forward end of the loop being in loose engagement with the draft point of the front unit and the rear end of the loop being pivotally attached to the rear unit.

6. A draft connection between units of a tandem disk harrow comprising an elongated loop laterally and adjustably attached to the draft point of the front unit and pivotally attached to the draft point of the rear unit.

7. A draft connection between units of a tandem disk harrow comprising an elongated loop pivotally attached at its front and rear ends to the draft points of the front and rear units, either end of said loop being laterally adjustable at the point of attachment.

Elora, December 20, 1917.

TORRANCE EDWARD BISSELL.

Signed in the presence of—
  T. C. WARDLEY,
  P. C. GREEN.